US010514109B2

(12) United States Patent
Miyachi et al.

(10) Patent No.: US 10,514,109 B2
(45) Date of Patent: Dec. 24, 2019

(54) VALVE OPENING AND CLOSING TIMING CONTROL APPARATUS

(71) Applicant: AISIN SEIKI KABUSHIKI KAISHA, Kariya-shi, Aichi-ken (JP)

(72) Inventors: Eiji Miyachi, Nishio (JP); Tomoharu Otake, Kariya (JP); Yoshiaki Iguchi, Kariya (JP); Shigemitsu Suzuki, Takahama (JP); Hiroki Mukaide, Chiryu (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 135 days.

(21) Appl. No.: 15/704,354

(22) Filed: Sep. 14, 2017

(65) Prior Publication Data

US 2018/0073656 A1 Mar. 15, 2018

(30) Foreign Application Priority Data

Sep. 15, 2016 (JP) ................................ 2016-180761

(51) Int. Cl.
*F01L 1/34* (2006.01)
*F16K 31/04* (2006.01)
(Continued)

(52) U.S. Cl.
CPC ............ *F16K 31/047* (2013.01); *F01L 1/344* (2013.01); *F16H 1/32* (2013.01); *F16H 35/008* (2013.01);
(Continued)

(58) Field of Classification Search
CPC ........ F16K 31/047; F16H 1/32; F16H 35/008; F16H 2001/327; F01L 1/344; F01L 1/352;
(Continued)

(56) References Cited

U.S. PATENT DOCUMENTS 7,603,975 B2  10/2009  Sugiura et al.
2017/0138228 A1  5/2017  Miyachi et al.

FOREIGN PATENT DOCUMENTS

JP  2008-038886 A  2/2008
JP  2009215954 A  9/2009
(Continued)

OTHER PUBLICATIONS

U.S. Appl. No. 15/704,298, filed Sep. 14, 2017, Eiji Miyachi et al.
(Continued)

*Primary Examiner* — Zelalem Eshete
(74) *Attorney, Agent, or Firm* — Buchanan Ingersoll & Rooney PC (57) ABSTRACT

A valve opening and closing timing control apparatus includes: a driving side rotator disposed rotatably about a rotation axis and configured to rotate synchronously with a crankshaft of an internal combustion engine; a driven side rotator disposed rotatably about the rotation axis and configured to be rotatable relative to the driving side rotator and to rotate integrally with a valve opening and closing camshaft of the internal combustion engine; and a phase adjustment mechanism configured to set a relative rotation phase between the driving side rotator and the driven side rotator by a driving force of an electric actuator. The phase adjustment mechanism includes: an internally toothed ring gear; an inner gear; and a drive shaft, and the valve opening and closing timing control apparatus further includes: a biasing member; and a displacement regulation portion.

16 Claims, 7 Drawing Sheets

(51) Int. Cl.
*F16H 1/32* (2006.01)
*F01L 1/344* (2006.01)
*F16H 35/00* (2006.01)
*F01L 1/047* (2006.01)

(52) U.S. Cl.
CPC ......... *F01L 1/047* (2013.01); *F16H 2001/327* (2013.01)

(58) Field of Classification Search
CPC . F01L 1/047; F01L 2820/032; F01L 2103/00; F01L 2250/02; F01L 2250/04; F01L 2810/04
See application file for complete search history.

(56) References Cited

FOREIGN PATENT DOCUMENTS

JP  2012-189050 A  10/2012
JP  2016-044627 A  4/2016

OTHER PUBLICATIONS

Extended European Search Report issued by the European Patent Office dated Feb. 7, 2018 in corresponding European Patent Application No. 17191115.9 (10 pages).
U.S. Appl. No. 15/704,298, filed Sep. 14, 2017 entitled "Valve Opening and Closing Timing Control Apparatus."

VALVE OPENING AND CLOSING TIMING CONTROL APPARATUS

CROSS REFERENCE TO RELATED APPLICATIONS

This application is based on and claims priority under 35 U.S.C. § 119 to Japanese Patent Application 2016-180761, filed on Sep. 15, 2016, the entire contents of which are incorporated herein by reference.

TECHNICAL FIELD

This disclosure relates to a valve opening and closing timing control apparatus, which sets a relative rotation phase between a driving side rotator and a driven side rotator by a driving force of an electric actuator.

BACKGROUND DISCUSSION

As a valve opening and closing timing control apparatus having the configuration described above, JP 2012-189050A (Reference 1) discloses a technology of a speed reduction mechanism in which a ring gear (a second internal toothed gear in Reference 1) is disposed coaxially with a rotation axis (a rotation axis line in Reference 1) and an inner gear (a second planetary gear in Reference 1) is disposed coaxially with an eccentric axis (an eccentric axis line in Reference 1), which has a posture parallel to the rotation axis, such that a portion of an external toothed portion of the inner gear is engaged with a portion of an internal toothed portion of the ring gear, and a drive shaft (a planetary carrier in Reference 1) is fitted into the inner gear.

In this technology, a biasing member (an elastic member in Reference 1), which applies a biasing force required for the engagement of the external toothed portion of the inner gear and the internal toothed portion of the ring gear, is disposed so as to be fitted on the outer periphery of the drive shaft. In addition, in this technology, there is provided a configuration in which components similar to the ring gear and the inner gear described above (a gear member and a first planetary gear in Reference 1) are coaxially disposed to enable two-stage speed reduction, and a pair of inner gears, which is disposed to overlap each other, is connected to each other via a rod-shaped connection member.

In the configuration described in Reference 1, a relative positional relationship between the ring gear and the inner gear in the engagement direction thereof is set by a biasing force of a biasing mechanism, and a relative positional relationship between the ring gear and the inner gear in the direction orthogonal to the biasing direction is set by the connection member.

Considering the engagement between the internal toothed portion of the ring gear and the external toothed portion of the inner gear, when there is a gap (a gap in the direction orthogonal to the biasing direction) between toothed surfaces, abnormal noise may be generated when the toothed surfaces come into contact with each other.

This problem may be solved by providing the rod-shaped connection member described in Reference 1 to regulate displacement of the inner gear in the direction orthogonal to the biasing direction. However, in the configuration in which the displacement of the inner gear is regulated by the connection member, the accuracy of the connection member is required and there is still room for improvement.

In particular, when a speed reduction mechanism is formed of a single ring gear and a single inner gear, a component having the same function as the connection member is especially required, which then causes an increase in the number of components.

Thus, a need exists for a valve opening and closing timing control apparatus which is not susceptible to the drawback mentioned above.

SUMMARY

A feature of an aspect of this disclosure resides in that a valve opening and closing timing control apparatus includes a driving side rotator disposed rotatably about a rotation axis and configured to rotate synchronously with a crankshaft of an internal combustion engine, a driven side rotator disposed rotatably about the rotation axis and configured to be rotatable relative to the driving side rotator and to rotate integrally with a valve opening and closing camshaft of the internal combustion engine, and a phase adjustment mechanism configured to set a relative rotation phase between the driving side rotator and the driven side rotator by a driving force of an electric actuator, wherein the phase adjustment mechanism includes an internally toothed ring gear disposed coaxially with the rotation axis, an inner gear disposed coaxially with an eccentric axis in a posture parallel to the rotation axis such that an external toothed portion thereof is engaged with a portion of an internal toothed portion of the ring gear, and a drive shaft fitted into the inner gear, wherein the phase adjustment mechanism is configured with a differential speed reduction mechanism in which the drive shaft is rotated about the rotation axis by the driving force of the electric actuator such that the inner gear revolves around the rotation axis while spinning on the eccentric axis, and wherein the valve opening and closing timing control apparatus further includes a biasing member provided on an outer peripheral portion of the drive shaft to apply a biasing force in a direction in which the external toothed portion of the inner gear is engaged with the internal toothed portion of the ring gear, and a displacement regulation portion provided between the drive shaft and the inner gear to regulate a displacement of the inner gear in a direction orthogonal to a biasing direction where the biasing force of the biasing member is applied on the basis of the drive shaft.

When a gap is present between the internal toothed portion of the ring gear and the external toothed portion of the inner gear, the inner gear is displaced in the direction in which the gap between the internal toothed portion and the external toothed portion is reduced when the electric actuator is driven. As a result of this displacement, smooth rotation is damaged as in backlash, which deteriorates responsiveness and generates abnormal noise due to contact between the external toothed portion and the internal toothed portion. On the other hand, with the configuration having the feature described above, even if a force is applied to the inner gear in the direction orthogonal to a biasing direction when the electric actuator is driven because a gap is present between the internal toothed portion of the ring gear and the external toothed portion of the inner gear, this displacement may be regulated by the displacement regulation portion. Therefore, responsiveness is improved and no abnormal noise is generated.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, embodiments disclosed here will be described with reference to the accompanying drawings.
Basic Configuration As illustrated in FIGS. 1 to 4, a valve opening and closing timing control apparatus 1 includes a driving side rotator A, which rotates synchronously with a crankshaft 2 of an engine E that is an internal combustion engine, a driven side rotator B, which rotates integrally with an intake camshaft 3, and a phase adjustment mechanism C, which sets a relative rotation phase between the driving side rotator A and the driven side rotator B by a driving force of a phase control motor M (an example of an electric actuator).

The engine E is configured in a four-cycle form in which pistons 4 are accommodated in a plurality of cylinder bores formed in a cylinder block and each piston 4 is connected to the crankshaft 2 via a connecting rod 5. A timing belt 6 (this may also be referred to as a timing chain) is wound around an output pulley 2S of the crankshaft 2 of the engine E and a driving pulley 11S of the driving side rotator A.

Therefore, when the engine E operates, the entire valve opening and closing timing control apparatus 1 rotates around a rotation axis X. In addition, the driven side rotator B is configured to be displaceable in the same rotation direction or in the reverse direction relative to the driving side rotator A by driving of the phase adjustment mechanism C.

In the valve opening and closing timing control apparatus 1, the driving of the phase control motor M is controlled by a control apparatus such as an ECU, etc. The phase adjustment mechanism C sets a relative rotation phase between the driving side rotator A and the driven side rotator B under this control, and with this setting, the control of the opening and closing timing of intake valves 3B is realized by cam portions 3A of the intake camshaft 3.
Valve Opening and Closing Timing Control Apparatus In the driving side rotator A, an outer case 11, which is provided with the driving pulley 11S, and a front plate 12 are fastened to each other using a plurality of fastening bolts 13. In the inner space of the outer case 11, the driven side rotator B and the phase adjustment mechanism C, which is configured with a hypotrochoid-type speed reduction gear (a concrete example of a differential speed reduction mechanism), are accommodated.

The driven side rotator B is configured with the ring gear 21, which is provided with the internal toothed portion 21A having a plurality of internal teeth. The phase adjustment mechanism C includes the ring gear 21, the inner gear 22, which is provided with the external toothed portion 22A having a plurality of external teeth engaged with the internal toothed portion 21A of the ring gear 21, a drive shaft 24 fitted into the inner gear 22, and a joint member 30 as a link mechanism that links the inner gear 22 to the driving side rotator A.

Figure 2:
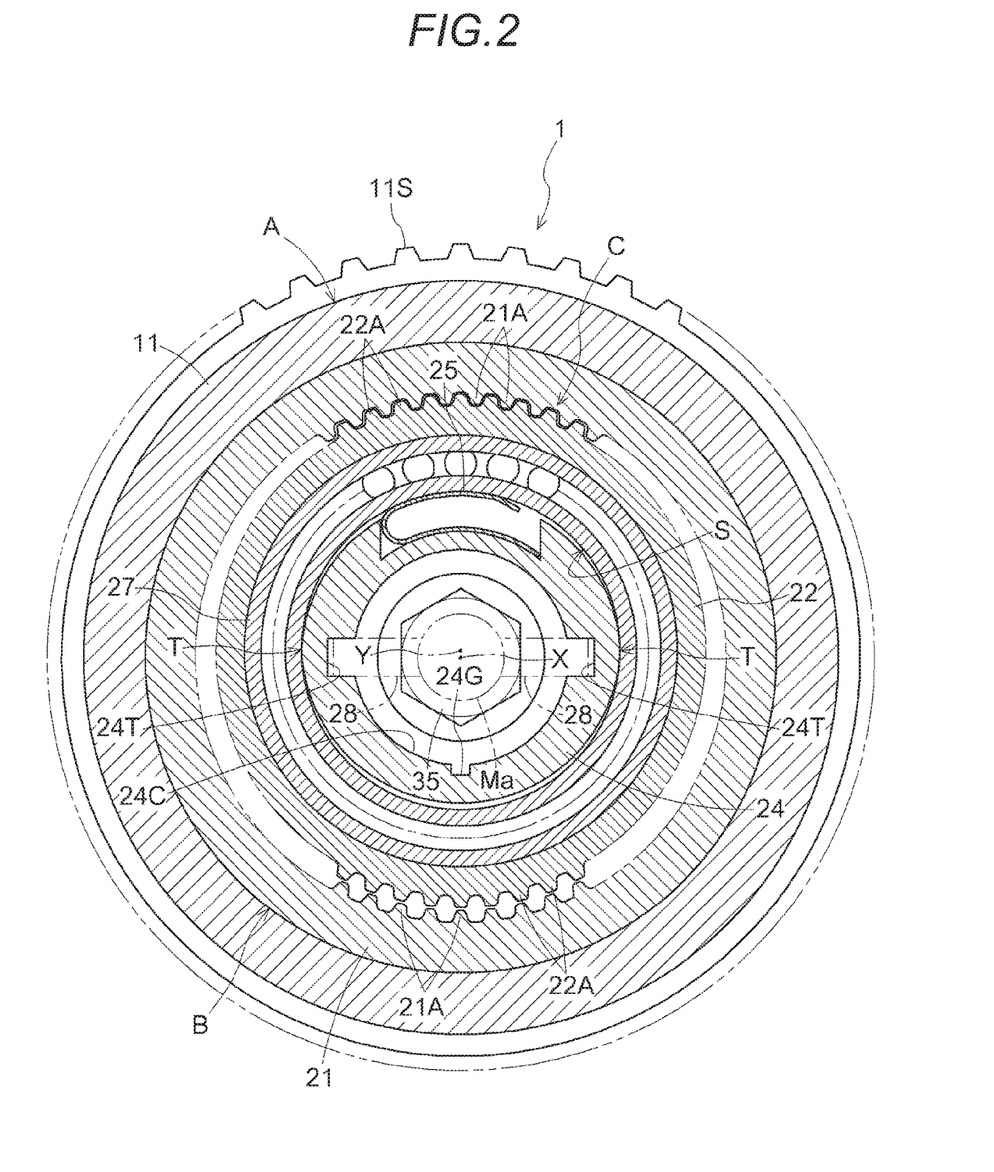
FIG. 2 is a cross-sectional view taken along line II-II of FIG. 1.

As illustrated in FIG. 2, the ring gear 21 is disposed coaxially with the rotation axis X, and the inner gear 22 is disposed coaxially with an eccentric axis Y, which has a posture parallel to the rotation axis X. A portion of the external toothed portion 22A is engaged with a portion of the internal toothed portion 21A of the ring gear 21, and the number of teeth of the external toothed portion 22A of the inner gear 22 is set to be smaller than the number of teeth of the internal toothed portion 21A of the ring gear 21 by one tooth.

As illustrated in FIGS. 1 to 4, the phase control motor M (electric motor) is supported on the engine E by a support frame 7 such that an output shaft Ma thereof is disposed coaxially with the rotation axis X.

The ring gear 21 has a structure in which a driven plate 21P, which has a posture orthogonal to the rotation axis X, is integrated with a ring-shaped portion on which the internal toothed portion 21A is formed. As a connection bolt 35 is inserted through a hole 24C in the center of the driven plate 21P and is screwed to the intake camshaft 3, the ring gear 21 is connected to the intake camshaft 3 so as to be located coaxially with the rotation axis X.

The drive shaft 24 is provided with a first support portion 24A having an outer peripheral surface about rotation axis X, on the outer end side thereof in the direction along the rotation axis X, and is provided with a second support portion 24B having an outer peripheral surface about the eccentric axis Y, on the inner end side thereof. One notch 24D is formed in the outer periphery of the second support portion 24B, and a spring 25, which serves as a biasing member, is fitted into the notch 24D. In addition, the hole 24C is formed in the drive shaft 24 about the rotation axis X, and a pair of engaging grooves 24T, into which an engaging member 28 of the output shaft Ma of the phase control motor M is engaged, is formed in the hole 24C so as to have a posture parallel to the rotation axis X.

Moreover, a single lubrication groove 24G, which has a posture parallel to the rotation axis X, is formed in the hole 24C, and a lubrication flow path 24R is formed to penetrate from the lubrication groove 24G to the outer surface. A pair of lubrication flow paths 24R is formed to penetrate from the pair of engaging grooves 24T to the outer surface.

Figure 1:
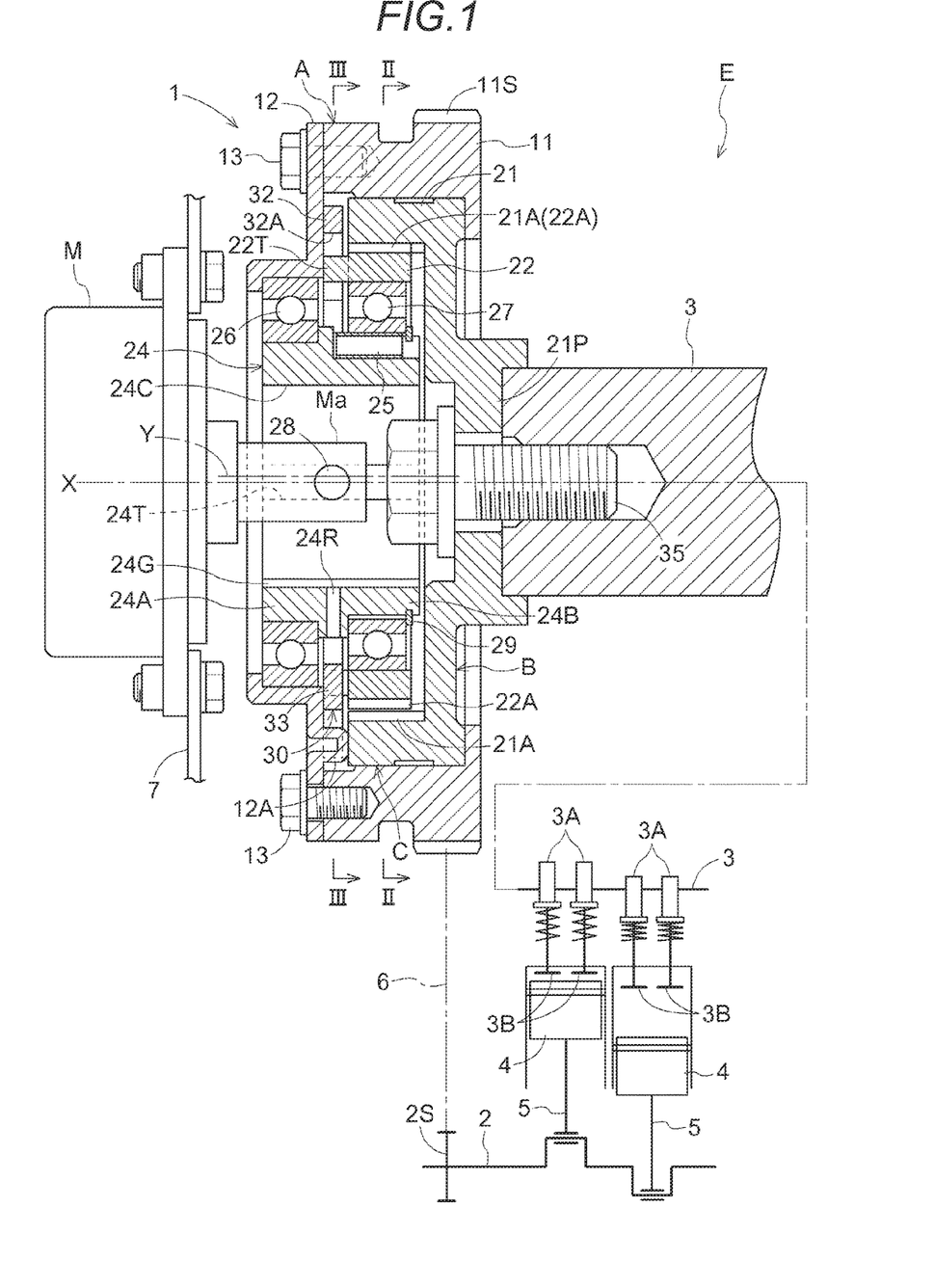
FIG. 1 is a cross-sectional view illustrating a valve opening and closing timing control apparatus.

As illustrated in FIG. 1, a first bearing 26, which is configured with a ball bearing, is disposed between an opening in the center of the front plate 12 and the first support portion 24A, so that the drive shaft 24 is supported to be rotatable relative to the driving side rotator A about the rotation axis X.

As illustrated in FIG. 2, a second bearing 27, which is configured with a ball bearing, is disposed between the inner periphery of the inner gear 22 and the second support portion 24B of the drive shaft 24, so that the second support portion 24B and the inner gear 22 are rotatable relative to each other about the eccentric axis Y. In addition, the biasing force of the spring 25 is applied to the inner peripheral surface S of the second bearing 27. Moreover, when a C-ring 29 as a stop ring is provided, separation of the second bearing 27 from the second support portion 24B is prevented (see FIGS. 1 and 4).

Therefore, the inner gear 22 is rotatably supported about the eccentric axis Y, and as illustrated in FIG. 2, a portion of the external toothed portion 22A is engaged with a portion of the internal toothed portion 21A of the ring gear 21, and the engagement is maintained by the biasing force of the spring 25. In addition, an operation mode of setting a relative rotational phase between the driving side rotator A and the driven side rotator B by the valve opening and closing timing control apparatus 1 will be described below.

Phase Adjustment Mechanism: Joint Member

Figure 4:
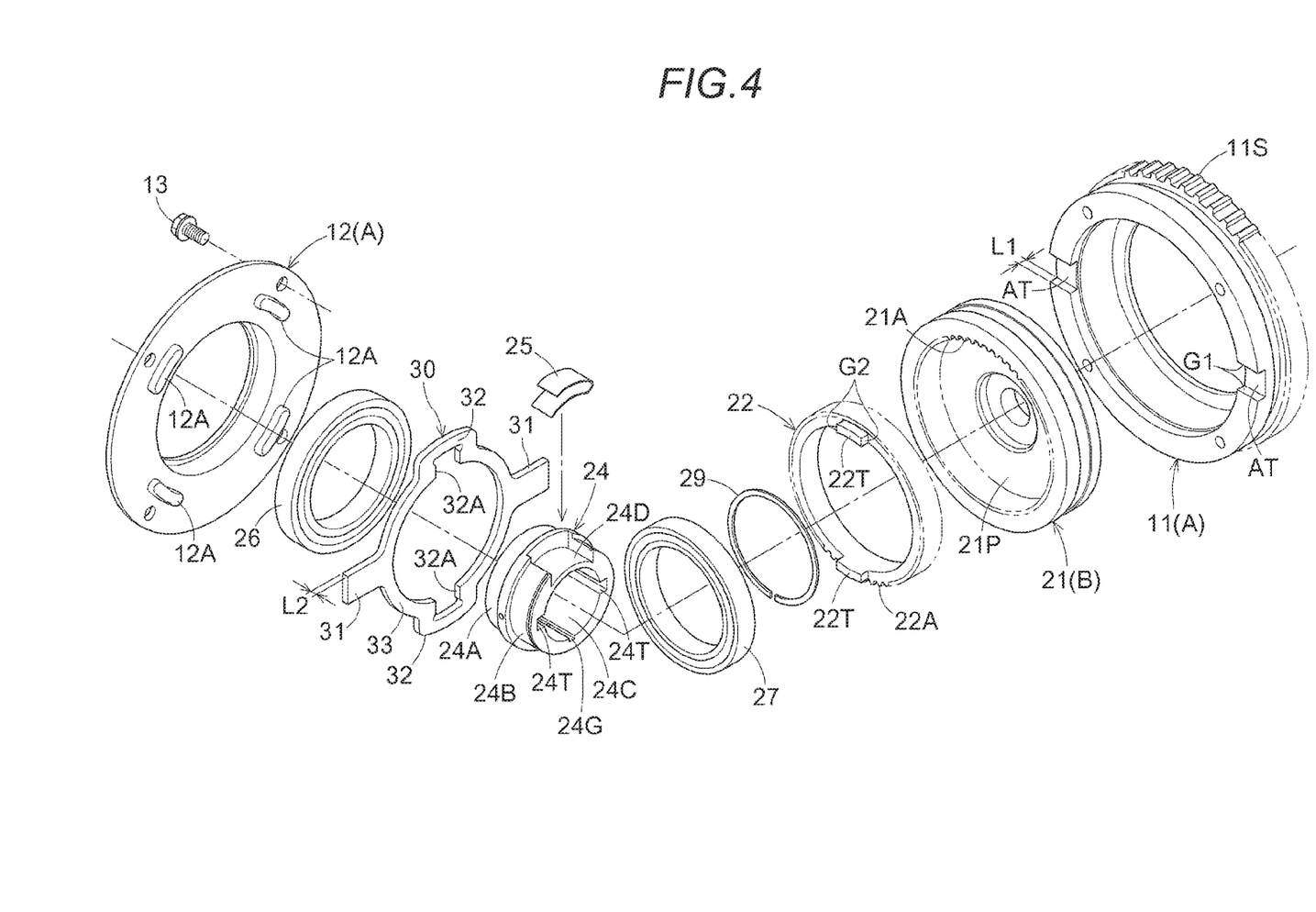
FIG. 4 is an exploded perspective view of the valve opening and closing timing control apparatus.

As illustrated in FIG. 4, the joint member 30, which constitutes the link mechanism, is manufactured by, for example, pressing a plate member. In the joint member 30, a pair of first engaging arms 31, which protrudes outward about the rotation axis X, a pair of second engaging arms 32, which protrudes in the direction orthogonal to the first engaging arms 31, and a ring-shaped portion 33, which interconnects the same, are integrally formed with one another. The second engaging arms 32 are provided respectively with engaging recesses 32A, which are open toward the rotation axis X.

When viewing the joint member 30 in the direction along the rotation axis X, the first engaging arms 31 are configured with plate-shaped areas, which linearly extend in a first direction, and the engaging recesses 32A of the second engaging arms 32 are concavely formed so as to be recessed in a second direction orthogonal to the first direction. In addition, the pair of first engaging arms 31, the pair of second engaging arms 32 and the ring-shaped portion 33 interconnecting the same are disposed in an imaginary plane orthogonal to the rotation axis X.

The outer case 11, which constitutes the driving side rotator A, is provided, with a pair of first link portions AT, which are formed in a through-hole shape to extend in the radial direction about the rotation axis X from the inner space to the outer space of the outer case 11, on a connection surface thereof, which is in contact with the front plate 12. The straight direction in which the pair of first link portions AT is arranged parallel to each other is the first direction (the horizontal direction in FIG. 3). In addition, the inner gear 22 is provided with a pair of second link portions 22T, which is formed in a protrusion shape at positions facing each other with the eccentric axis Y interposed therebetween, on the end surface thereof. The direction in which the pair of second link portions 22T is arranged parallel to each other is the second direction (the vertical direction in FIG. 3).

Figure 3:
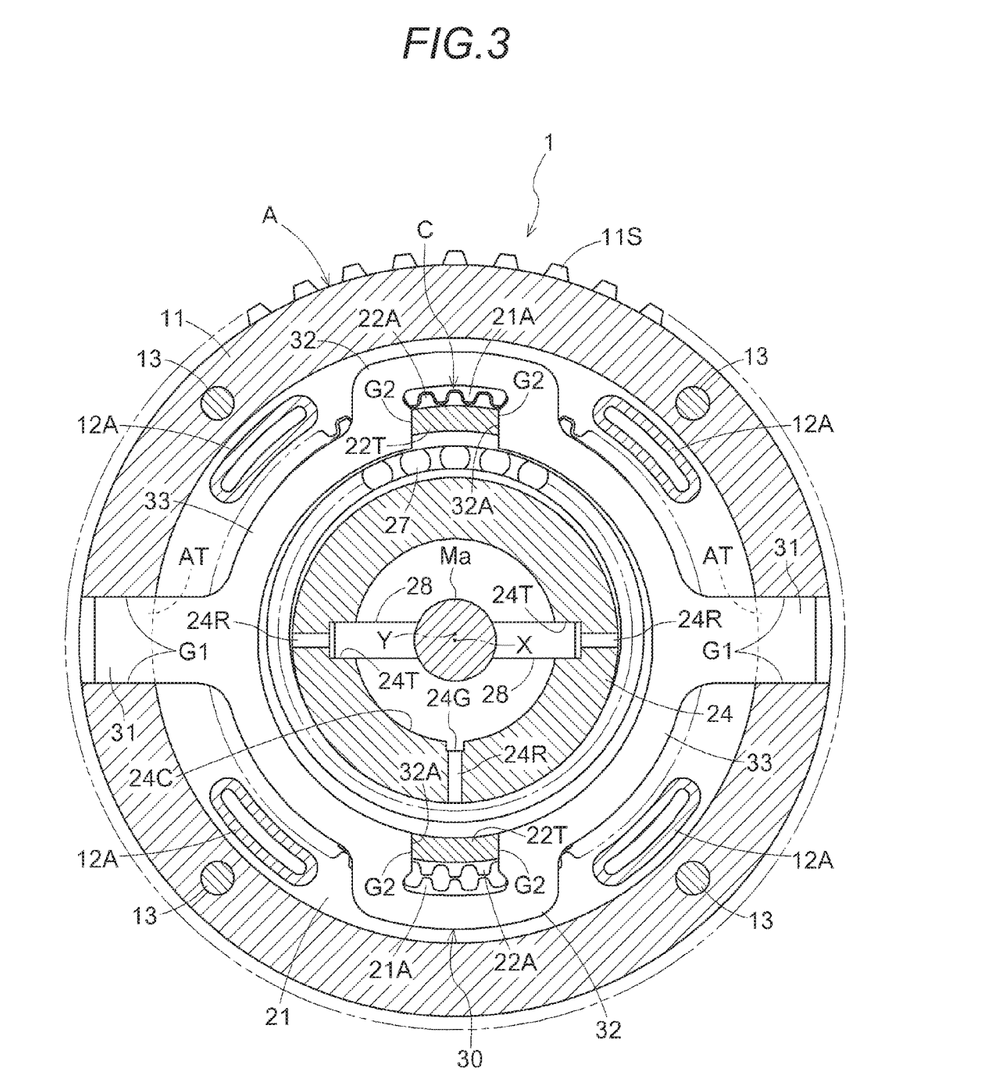
FIG. 3 is a cross-sectional view taken along line III-Ill of FIG. 1.

As illustrated in FIGS. 3 and 4, each first link portion AT is provided with a pair of first guide surfaces G1, which has a posture parallel to the first direction when viewing in the direction along the rotation axis X. In addition, each second link portion 22T is formed as a rectangular portion having a pair of second guide surfaces G2, which has a posture parallel to the second direction when viewing in the direction along the rotation axis X.

With this configuration, when the first engaging arms 31 of the joint member 30 are engaged with the first link portions AT and the engaging recesses 32A of the second engaging arms 32 of the joint member 30 are engaged with the second link portions 22T, the link member 30 may function as an Oldham's coupling.

In addition, in this configuration, there is a positional relationship in which linear portions of the first engaging arms 31 come into contact with the first guide surfaces G1 of the first link portions AT and linear portions of the recesses of the second engaging arms 32 come into contact with the second guide surfaces G2 of the second link portions 22T.

As illustrated in FIG. 4, the recessed depth L1 of the first link portion AT is set to a sufficiently larger value than the thickness L2 of the first engaging arm 31. Thus, when the front surface of the first engaging arm 31 and the front plate 12 come into contact with each other, a gap is formed between the rear surface of the first engaging arm 31 and the bottom portion of the first link portion AT.

Moreover, a plurality of protrusions 12A protrudes from the inner surface of the front plate 12 and determines the position of the ring gear 21 in the direction along the rotation axis X by coming into contact with the end surface of the ring gear 21.

Operation Mode of Phase Adjustment Mechanism

In the valve opening and closing timing control apparatus 1, a control apparatus (not illustrated) is provided to control the phase control motor M, and when maintaining a relative rotational phase between the driving side rotator A and the driven side rotator B, the drive shaft 24 is rotated at the same speed as the rotation speed of the intake camshaft 3.

On the other hand, when setting a relative rotational phase between the driving side rotator A and the driven side rotator B to a target phase, the output shaft Ma of the phase control motor M is rotated at a higher or lower speed than the rotation speed of the intake camshaft 3.

Therefore, the eccentric axis Y of the second support portion 24B revolves around the rotation axis X, and with this revolution, the engagement position of the internal toothed portion 21A of the ring gear 21 with respect to the external toothed portion 22A of the inner gear 22 is displaced along the inner periphery of the ring gear 21, and simultaneously, the inner gear 22 spins on the eccentric axis Y.

When the eccentric axis Y of the inner gear 22 revolves around the rotation axis X, because the displacement of the inner gear 22 is transmitted from the second link portion 22T to the engaging recess 32A, the joint member 30 operates to be displaced in the first direction and the second direction so that the driven side rotator B is rotated relative to the driving side rotator A by an angle that corresponds to the amount of relative displacement between the ring gear 21 and the inner gear 22, whereby the control of the valve opening and closing time is realized.

Specifically, because the number of teeth of the external toothed portion 22A of the inner gear 22 is set to be smaller by only one tooth than the number of teeth of the internal toothed portion 21A of the ring gear 21, when the eccentric axis Y of the inner gear 22 revolves once around the rotation axis X, a speed reduction transmission state where a rotational force is applied to the ring gear 21 by an angle that corresponds to one tooth is obtained to realize large speed reduction.

In addition, upon this speed reduction, because the relative rotation between the inner gear 22 and the outer case 11, which constitutes the driving side rotator A, is regulated by the joint member 30, the ring gear 21 is rotated about the rotation axis X by the rotational force acting such that the inner gear 22 spins as the inner gear 22 revolves. That is, as the inner gear 22 revolves with respect to the ring gear 21, the ring gear 21 is rotated on the basis of the driving side rotator A, and consequently, a relative rotation phase between the driving side rotator A and the driven side rotator B is set to realize the setting of the opening and closing time by the intake camshaft 3.

The valve opening and closing timing control apparatus 1 is disposed inside a case of a chain, which is driven by the intake camshaft 3 and an exhaust camshaft of the engine E. With such a positional relationship, some of a lubricating oil supplied to the camshaft or the chain moves from the opening in the center of the front plate 12 into the hole 24C in the drive shaft 24 to thereby be supplied to each part in the inner space of the outer case 11, thereby ensuring smooth operation of the phase adjustment mechanism C.

Displacement Regulation Portion

As illustrated in FIG. 2, in this embodiment, although the inner peripheral surface S of the second bearing 27 functions as the inner peripheral surface of the inner gear 22 because the second bearing 27, which is formed in a ring shape, is fitted into the inner peripheral surface of the inner gear 22, a configuration in which the spring 25 comes into contact with the inner peripheral surface of the inner gear 22 without using the second bearing 27 may be adopted.

In addition, in this embodiment, because the inner peripheral surface S of the second bearing 27 functions as the inner peripheral surface of the inner gear 22, displacement regulation portions T to be described below are brought into contact with the inner peripheral surface S of the second bearing 27. Instead of this configuration, the displacement regulation portions T may be brought into contact with the inner peripheral surface of the inner gear 22 without using the second bearing 27.

Moreover, a bush-shaped second bearing 27 may be provided on the inner periphery of the inner gear 22 so that the inner periphery of the second bearing 27 functions as the inner periphery of the inner gear 22.

Figure 5:
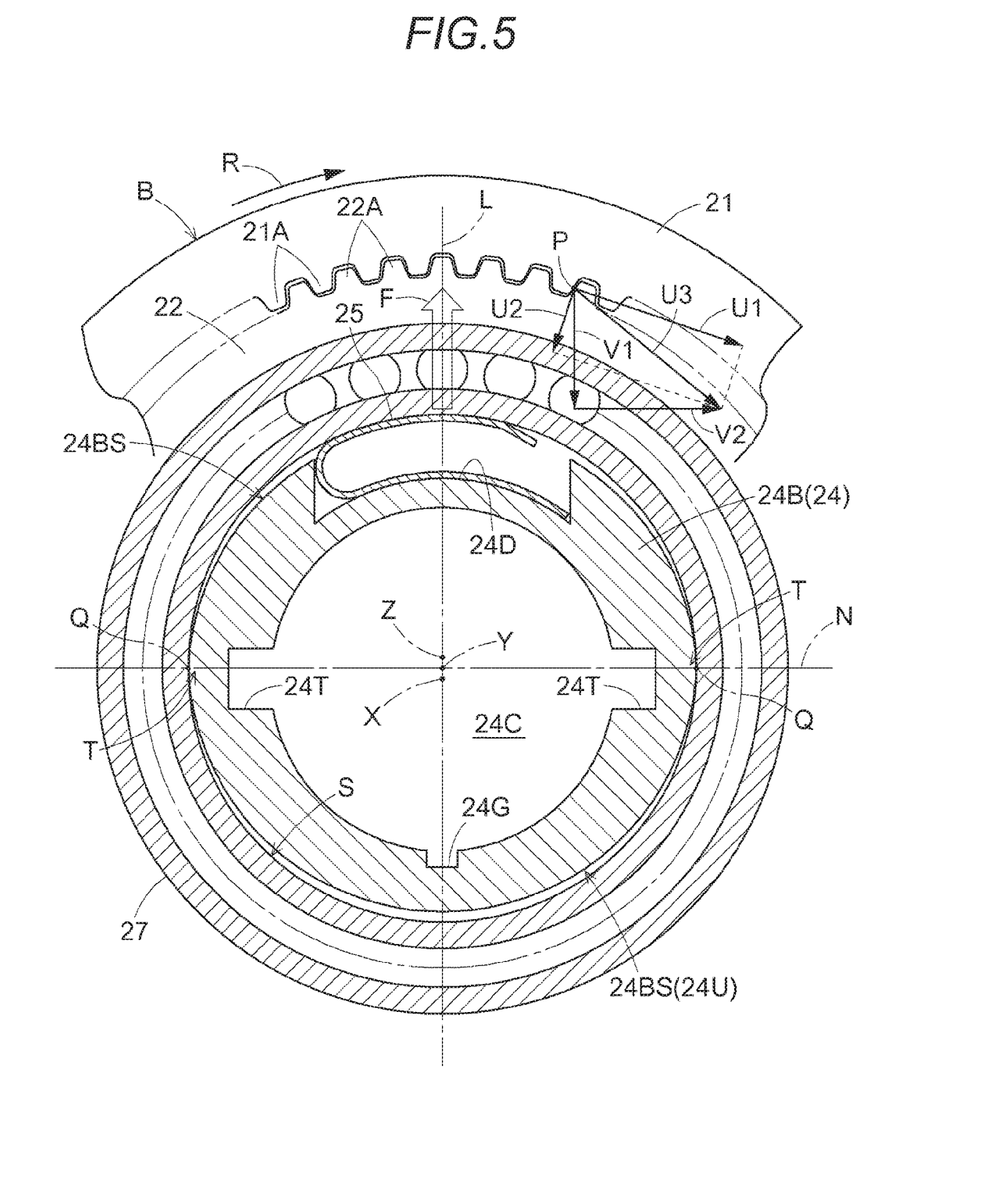
FIG. 5 is an enlarged cross-sectional view illustrating a relationship between a displacement regulation portion and a biasing direction.

As illustrated in FIG. 5, assuming that an imaginary straight line that interconnects the rotation axis X and the eccentric axis Y is a deviation directional line L, the biasing direction F in which the biasing force is applied from the spring 25 to the inner gear 22 (the inner periphery of the second bearing 27) coincides with the deviation directional line L. In addition, the internal toothed portion 21A of the ring gear 21 and the external toothed portion 22A of the inner gear 22 are most deeply engaged with each other on the extension of the biasing direction F.

As described above, the first support portion 24A of the drive shaft 24 is supported on the front plate 12 via the first bearing 26 so as to be rotatable about the rotation axis X, and the spring 25 is provided so as to be fitted into the notch 24D in the outer periphery of the second support portion 24B of the drive shaft 24.

Due to this configuration, for example, in a configuration in which the inner gear 22 is not regulated, when a gap is present between the internal toothed portion 21A of the ring gear 21 and the external toothed portion 22A of the inner gear 22, a force acts to displace the inner gear 22 in the direction in which the gap between the internal toothed portion 21 and the external toothed portion 22A is reduced when the phase control motor M is driven. When the inner gear 22 is displaced by the action of this force, smooth rotation may be damaged as in backlash, which may deteriorate responsiveness and may generate abnormal noise due to contact between the internal toothed portion and the external toothed portion.

In addition, considering the situation in which the cam fluctuation torque R is applied, as illustrated in FIG. 5, when the valve opening and closing timing control apparatus 1 rotates, the internal toothed portion 21A of the ring gear 21 and the external toothed portion 22A of the inner gear 22 most strongly come into contact with each other at the downstream side of the direction in which the cam fluctuation torque R is applied on the basis of the deviation directional line L.

In this manner, when indicating a relationship of force as a vector by assuming the position at which the toothed surface of the internal toothed portion 21A and the toothed surface of the external toothed portion 22A most strongly come into contact with each other as a contact point P, a cam torque U1 is applied in the tangential direction on the basis of the contact point P and a central direction force U2 is applied from the contact point P toward the direction of the rotation axis X, whereby the resultant force U3 is conceivable. In addition, an eccentric direction force V1 is applied to the contact point P in the direction against the biasing force of the spring 25 between the ring gear 21 and the inner gear 22, and a horizontal direction force V2 is present between the eccentric direction force V1 and the resultant force U3. In addition, the absolute value of the eccentric direction force V1 and the absolute value of the biasing force applied in the biasing direction F become equal to each other.

In addition, because the value of the cam fluctuation torque R increases or decreases based on the rotation of the intake camshaft 3, the horizontal direction force V2 also increases or decreases. Therefore, the horizontal direction force V2 causes the inner gear 22 to vibrate in the direction orthogonal to the deviation directional line L. For this reason, the inner gear 22 is deviated to vibrate even by the action of the cam fluctuation torque R, which deteriorates responsiveness and generates abnormal noise.

In order to suppress this problem, as illustrated in FIG. 5, the displacement regulation portions T are provided to regulate displacement of the inner gear 22 in the direction orthogonal to the biasing direction F. That is, assuming a center line N that passes through the eccentric axis Y and has a posture orthogonal to the deviation directional line L, two intersection points Q at which the center line N and the inner peripheral surface S of the second bearing 27 (the inner peripheral surface of the inner race) cross each other may be assumed on an outer peripheral surface 24BS of the second support portion 24B of the drive shaft 24.

The displacement regulation portions T are formed at the two positions on the second support portion 24B in such a manner that the outer peripheral surface 24BS of the second support portion 24B of the drive shaft 24 has a slightly larger diameter so that the distance between the two assumed intersection points Q becomes the outer diameter.

In particular, when a counter-biasing side surface 24U (the lower side in FIG. 5), which is opposite the spring 25 with the eccentric axis Y interposed therebetween, is formed on a circumferential surface of the outer peripheral surface 24BS of the second support portion 24B about a sub axis Z, a slight gap is formed between the outer peripheral surface 24BS and the inner peripheral surface S of the second bearing 27. In addition, when a circumferential surface of the outer peripheral surface 24BS of the second support portion 24B (the upper side in FIG. 5), which is closer to the spring 25 than the eccentric axis Y, is formed about an axis (not illustrated), which is opposite the sub axis Z on the basis of the eccentric axis Y, a slight gap is formed between the outer peripheral surface 24BS and the inner peripheral surface S of the second bearing 27.

As illustrated in FIG. 5, the sub axis Z is set to a position that it intersects with the deviation directional line L between the eccentric axis Y and the spring 25. The distance (radius) to the counter-biasing side surface 24U about the sub axis Z is set to a value that is equal to the radius to the inner peripheral surface S about the eccentric axis Y. In addition, in FIG. 5, although the distance between the eccentric axis Y and the sub axis Z is small and the distance between the counter-biasing side surface 24U and the inner peripheral surface S is small, these distances are exaggerated.

Likewise, the axis (not illustrated) is set to a position at which it intersects with the deviation directional line L on the side farther from the spring 25 than the eccentric axis Y. In FIG. 5, the distance (radius) to the upper outer peripheral surface 24BS about the axis is set to a value that is equal to the radius to the inner peripheral surface S about the eccentric axis Y.

As described above, in FIG. 5, the displacement regulation portions T are formed by machining the boundary between the upper outer peripheral surface 24BS and the lower outer peripheral surface 24BS to have the largest diameter, and the displacement regulation portions T are formed on the center line N.

In this configuration, in a state where the second support portion 24B of the drive shaft 24 is inserted into the inner periphery of the second bearing 27 of the inner gear 22, the respective displacement regulation portions T come into contact with the inner peripheral surface in a state where the pair of displacement regulation portions T is slightly displaced in the counter spring direction from the intersection points Q by the action of the biasing force of the spring 25.

Therefore, the displacement of the inner gear 22 is regulated in the direction orthogonal to the biasing direction F of the inner gear 22 (the direction along the center line N). As a result, even if a gap is present between the internal toothed portion 21A of the ring gear 21 and the external toothed portion 22A of the inner gear 22, the displacement of the inner gear 22 is regulated by the pair of displacement regulation portions T in the direction in which the gap between the internal toothed portion 21A and the external toothed portion 22A is reduced during driving of the phase control motor M. Therefore, responsiveness of the valve opening and closing timing control apparatus 1 is improved, and no abnormal noise is generated due to contact between the internal toothed portion 21A and the external toothed portion 22A.

In addition, in this configuration, the displacement regulation portions T may be formed by general machining such as, for example, grinding without requiring a special member.

Moreover, because a gap is formed by slightly separating the counter-biasing side surface 24U from the inner peripheral surface S of the second bearing 27, for example, even if there is a machining error, the counter-biasing side surface 24U is securely spaced apart from the inner peripheral surface S of the second bearing 27 and the displacement regulation portions T are brought into contact with appropriate positions on the inner peripheral surface S, which prevents damage to the function of the displacement regulation portions T.

In addition, an oil may be supplied to an arced gap formed between the counter-biasing side surface 24U of the drive shaft 24 and the inner peripheral surface S of the inner gear 22, the relative rotation between the drive shaft 24 and the inner gear 22 may be smoothly performed by the supplied oil, and the oil may function as a shock-observing material to prevent the contact between the counter-biasing side surface 24U and the inner peripheral surface S of the inner gear 22.

In the configuration of the present embodiment, because the relative rotation phase may be set to achieve good responsiveness, for example, when stopping the engine E, the time taken until the engine E is completely stopped may be reduced by a quick operation even when the valve opening and closing time control apparatus 1 is controlled to achieve the relative rotation phase suitable for the starting of the engine E.

Another Embodiment

The present invention may be configured as follows, in addition to the above-described embodiment (the same numbers and reference numerals will be given to those having the same function as the embodiment).

Figure 6:
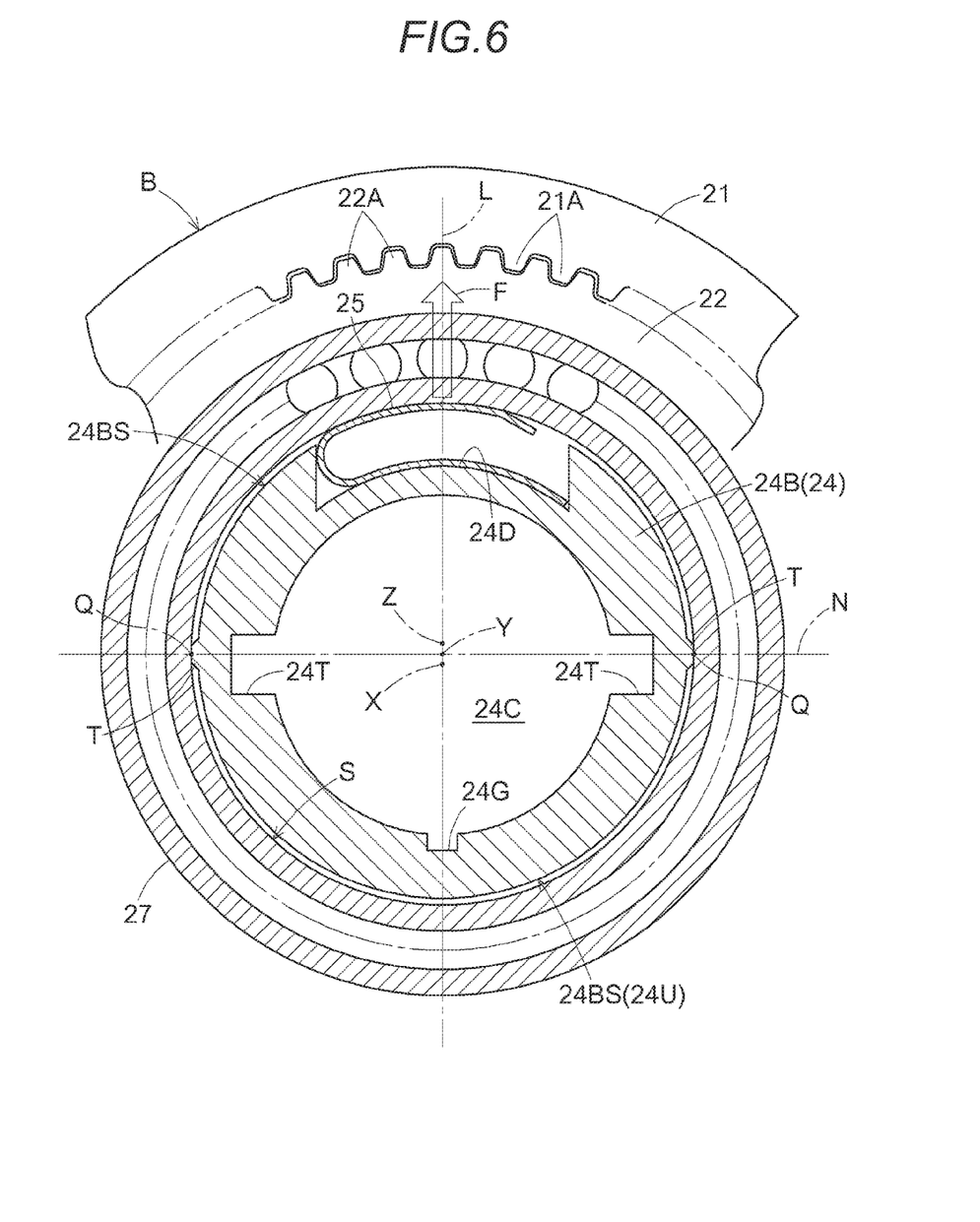
FIG. 6 is an enlarged cross sectional view illustrating the displacement regulation portion according to another embodiment (a)

(a) As illustrated in FIG. 6, a pair of displacement regulation portions T is formed integrally with the drive shaft 24 so as to protrude from the outer peripheral surface 24BS of the second support portion 24B of the drive shaft 24 in the direction along the center line N. In this configuration, the distance between the pair of displacement regulation portions T is set to a value that is equal to the distance between two intersection points Q at which the center line N and the inner peripheral surface S of the second bearing 27 (the inner peripheral surface of the inner race) cross each other.

Even in this configuration, a slight gap is formed between the counter-biasing side surface 24U, which is opposite the spring 25 with the eccentric axis Y interposed therebetween, and the inner peripheral surface S. In addition, in the same manner as in the above embodiment, the counter-biasing side surface 24U and the outer peripheral surface 24BS opposite thereto may be formed in a circumferential shape about a predetermined position that is different from the eccentric axis Y.

Figure 7:
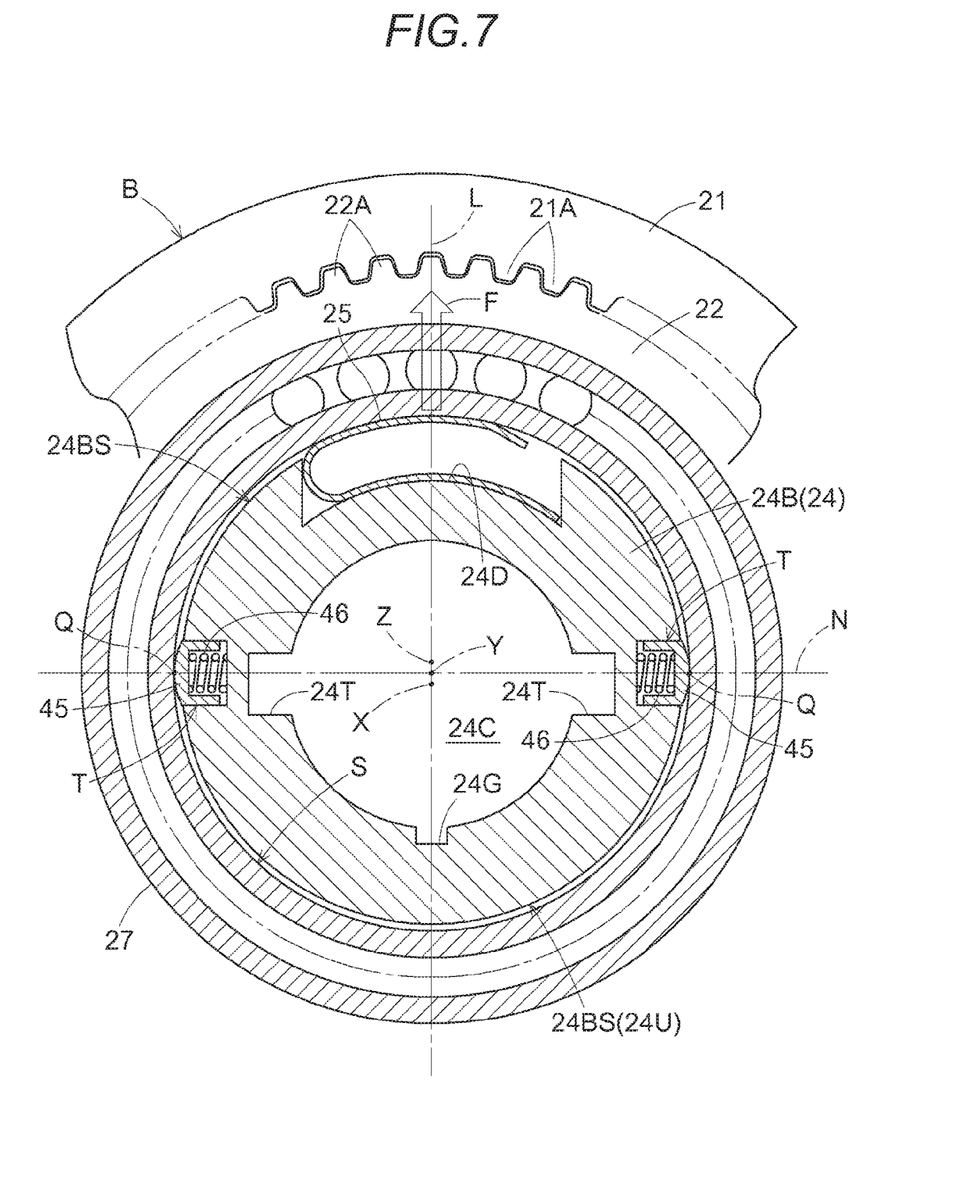
FIG. 7 is an enlarged cross sectional view illustrating the displacement regulation portion according to a further embodiment (b).

(b) As illustrated in FIG. 7, instead of the configuration of the other embodiment (a), the displacement regulation portions T may be configured with protruding pieces 45 and springs 46, which biases the protruding pieces 46 so as to protrude outward.

With such a configuration, even if the protruding pieces 45 are worn, the protruding pieces 45 may be brought into contact with the inner peripheral surface S. Therefore, even if a positional relationship between the drive shaft 24 and the inner gear 22 varies in the direction orthogonal to the biasing direction F in the worn state of the protruding pieces 45, vibration depending on the variation may be suppressed. In addition, as a component to protrude the displacement regulation portions T by a biasing force, for example, a leaf spring may be configured to come into contact with the inner peripheral surface S, thereby serving as the displacement regulation portion T.

(c) Contrary to the embodiments, the valve opening and closing timing control apparatus 1 is configured such that, as the phase adjustment mechanism C, the ring gear 21 is linked to the driven side rotator B and the inner gear 22 is linked to the driving side rotator A. This configuration also realizes satisfactory speed reduction.

(d) The direction in which the spring 25 as a biasing mechanism applies a biasing force is set to a position that is spaced apart from the deviation directional line L. That is, it is unnecessary to apply the biasing force of the spring 25 in the direction along the deviation directional line L in order to maintain the engaged state of the internal toothed portion 21A and the external toothed portion 22A, and for example, it is conceivable that the biasing direction is set to a direction in consideration of the driving-reaction force of the camshaft or the cam fluctuation torque.

This disclosure may be used in a valve opening and closing timing control apparatus that sets a relative rotation phase between a driving side rotator and a driven side rotator by an electric actuator.

A feature of an aspect of this disclosure resides in that a valve opening and closing timing control apparatus includes a driving side rotator disposed rotatably about a rotation axis and configured to rotate synchronously with a crankshaft of an internal combustion engine, a driven side rotator disposed rotatably about the rotation axis and configured to be rotatable relative to the driving side rotator and to rotate integrally with a valve opening and closing camshaft of the internal combustion engine, and a phase adjustment mechanism configured to set a relative rotation phase between the driving side rotator and the driven side rotator by a driving force of an electric actuator, wherein the phase adjustment mechanism includes an internally toothed ring gear disposed coaxially with the rotation axis, an inner gear disposed coaxially with an eccentric axis in a posture parallel to the rotation axis such that an external toothed portion thereof is engaged with a portion of an internal toothed portion of the ring gear, and a drive shaft fitted into the inner gear, wherein the phase adjustment mechanism is configured with a differential speed reduction mechanism in which the drive shaft is rotated about the rotation axis by the driving force of the electric actuator such that the inner gear revolves around the rotation axis while spinning on the eccentric axis, and wherein the valve opening and closing timing control apparatus further includes a biasing member provided on an outer peripheral portion of the drive shaft to apply a biasing force in a direction in which the external toothed portion of the inner gear is engaged with the internal toothed portion of the ring gear, and a displacement regulation portion provided between the drive shaft and the inner gear to regulate a displacement of the inner gear in a direction orthogonal to a biasing direction where the biasing force of the biasing member is applied on the basis of the drive shaft.

When a gap is present between the internal toothed portion of the ring gear and the external toothed portion of the inner gear, the inner gear is displaced in the direction in which the gap between the internal toothed portion and the external toothed portion is reduced when the electric actuator is driven. As a result of this displacement, smooth rotation is damaged as in backlash, which deteriorates responsiveness and generates abnormal noise due to contact between the external toothed portion and the internal toothed portion. On the other hand, with the configuration having the feature described above, even if a force is applied to the inner gear in the direction orthogonal to a biasing direction when the electric actuator is driven because a gap is present between the internal toothed portion of the ring gear and the external toothed portion of the inner gear, this displacement may be regulated by the displacement regulation portion. Therefore, responsiveness is improved and no abnormal noise is generated.

In addition, when the valve opening and closing timing control apparatus rotates, this results a phenomenon in which a force is applied to the inner gear in the direction orthogonal to the direction in which the biasing force is applied by the biasing member by a cam fluctuation torque applied from the camshaft. This phenomenon will be described with reference to FIG. 5. In FIG. 5, toothed surfaces at which an internal toothed portion 21A of a ring gear 21 and an external toothed portion 22A of an inner gear 22 most strongly come into contact with each other by the action of a cam fluctuation torque R are referred to as a contact point P. A cam torque U1, a central direction force U2, a resultant force U3, an eccentric direction force V1, and a horizontal direction force V2, which are applied on the basis of the contact point P, are indicated by vectors. Among these forces, the horizontal direction force V2 is applied in the direction orthogonal to the direction in which the biasing force is applied by a spring 25 (the biasing member). Thus, the inner gear 22 is displaced, thereby causing deterioration in responsiveness or generation of abnormal noise.

In particular, in this configuration, because the displacement regulation portion may be configured by changing the shape of the drive shaft, for example, the displacement regulation portion may be formed by general machining such as grinding, etc. without requiring a special member in order to form the displacement regulation portion.

Accordingly, the valve opening and closing timing control apparatus has a simplified configuration and may operate with high responsiveness by suppressing abnormal noise caused by the presence of a gap between the internal toothed portion of the ring gear and the external toothed portion of the inner gear.

As another configuration, the outer periphery of the drive shaft may include a counter-biasing side surface, which is opposite the biasing member with the eccentric axis interposed therebetween, and the counter-biasing side surface may be spaced apart from an inner peripheral surface of the inner gear.

With this configuration, because it is sufficient to set the dimension such that the displacement regulation portion is brought into contact with the inner peripheral surface of the inner gear, high precision is not required for the formation of the counter-biasing side surface and machining becomes easy. In addition, even if there is a machining error, when the displacement regulation portion is brought into contact with an appropriate position on the inner peripheral surface of the inner gear, the displacement regulation portion may function well.

As another configuration, the counter-biasing side surface may be formed as a circumferential surface having a center deviated toward the biasing member from the eccentric axis.

With this configuration, because the counter-biasing side surface is formed as a circumferential surface, for example, when the drive shaft is manufactured using a lathe or the like, the counter-biasing side surface may be made in a process of changing the position of a chuck, which ensures easy machining. In addition, in this configuration, because the diameter of the drive shaft is not extremely reduced, there is no possibility that the strength is reduced.

As another configuration, the counter-biasing side surface may have the same radius as a radius of the inner peripheral surface about the eccentric axis.

With this configuration, an arc-shaped gap may be formed between the counter-biasing side surface of the drive shaft and the inner peripheral surface of the inner gear, and an oil may be supplied to the gap. When the oil is supplied as described above, the relative rotation between the drive shaft and the inner gear may be smoothly performed, and the oil may function as a shock-absorbing material, thereby preventing the counter-biasing side surface of the drive shaft from coming into contact with the inner peripheral surface of the inner gear.

As another configuration, the inner gear may be provided with a ring-shaped bearing on an inner periphery thereof so that an inner peripheral surface of the bearing functions as the inner peripheral surface of the inner gear.

With this configuration, even with a configuration including a bearing such as a ball bearing, the inner periphery of the bearing may function as the inner periphery of the inner gear to enable a reduction in the biasing force of the biasing member, which may maintain sufficient engagement between the ring gear and the inner gear, may suppress abnormal noise and may improve a response speed.

As another configuration, a pair of the displacement regulation portions may be provided on an outer peripheral surface of the drive shaft to protrude in a direction orthogonal to the biasing direction where the biasing force of the biasing member is applied on the basis of the drive shaft.

As another configuration, a pair of the displacement regulation portions, each including a protruding piece that protrudes in a direction orthogonal to the biasing direction where the biasing force of the biasing member is applied on the basis of the drive shaft and a spring that biases the protruding piece so as to protrude outward, may be provided on an outer peripheral surface of the drive shaft.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A valve opening and closing timing control apparatus comprising:
    a driving side rotator disposed rotatably about a rotation axis and configured to rotate synchronously with a crankshaft of an internal combustion engine;
    a driven side rotator disposed rotatably about the rotation axis and configured to be rotatable relative to the driving side rotator and to rotate integrally with a valve opening and closing camshaft of the internal combustion engine; and
    a phase adjustment mechanism configured to set a relative rotation phase between the driving side rotator and the driven side rotator by a driving force of an electric actuator,
    wherein the phase adjustment mechanism includes:
        an internally toothed ring gear disposed coaxially with the rotation axis;
        an inner gear disposed coaxially with an eccentric axis in a posture parallel to the rotation axis such that an external toothed portion thereof is engaged with a portion of an internal toothed portion of the ring gear; and
        a drive shaft fitted into the inner gear,
    the phase adjustment mechanism is configured with a differential speed reduction mechanism in which the drive shaft is rotated about the rotation axis by the driving force of the electric actuator such that the inner gear revolves around the rotation axis while spinning on the eccentric axis, and
    the valve opening and closing timing control apparatus further comprises:
        a biasing member provided on an outer peripheral portion of the drive shaft to apply a biasing force in a direction in which the external toothed portion of the inner gear is engaged with the internal toothed portion of the ring gear; and
        a displacement regulation portion provided between the drive shaft and the inner gear to regulate a displacement of the inner gear in a direction orthogonal to a biasing direction where the biasing force of the biasing member is applied on the basis of the drive shaft,
    wherein a pair of the displacement regulation portions are provided on an outer peripheral surface of the drive shaft to protrude in a direction orthogonal to the biasing direction where the biasing force of the biasing member is applied on the basis of the drive shaft.

2. The valve opening and closing timing control apparatus according to claim 1,
    wherein the outer periphery of the drive shaft includes a counter-biasing side surface, which is opposite to the biasing member with the eccentric axis interposed therebetween, and the counter-biasing side surface is spaced apart from an inner peripheral surface of the inner gear.

3. The valve opening and closing timing control apparatus according to claim 2,
    wherein the counter-biasing side surface is formed as a circumferential surface having a center deviated toward the biasing member from the eccentric axis.

4. The valve opening and closing timing control apparatus according to claim 3,
    wherein the counter-biasing side surface has the same radius as a radius of the inner peripheral surface about the eccentric axis.

5. The valve opening and closing timing control apparatus according to claim 1,
    wherein the inner gear is provided with a ring-shaped bearing on an inner periphery thereof so that an inner peripheral surface of the bearing functions as the inner peripheral surface of the inner gear.

6. The valve opening and closing timing control apparatus according to claim 2,
    wherein the inner gear is provided with a ring-shaped bearing on an inner periphery thereof so that an inner peripheral surface of the bearing functions as the inner peripheral surface of the inner gear.

7. The valve opening and closing timing control apparatus according to claim 3,
    wherein the inner gear is provided with a ring-shaped bearing on an inner periphery thereof so that an inner peripheral surface of the bearing functions as the inner peripheral surface of the inner gear.

8. The valve opening and closing timing control apparatus according to claim 4,
    wherein the inner gear is provided with a ring-shaped bearing on an inner periphery thereof so that an inner peripheral surface of the bearing functions as the inner peripheral surface of the inner gear.

9. A valve opening and closing timing control apparatus comprising:
    a driving side rotator disposed rotatably about a rotation axis and configured to rotate synchronously with a crankshaft of an internal combustion engine;
    a driven side rotator disposed rotatably about the rotation axis and configured to be rotatable relative to the driving side rotator and to rotate integrally with a valve opening and closing camshaft of the internal combustion engine; and
    a phase adjustment mechanism configured to set a relative rotation phase between the driving side rotator and the driven side rotator by a driving force of an electric actuator,
    wherein the phase adjustment mechanism includes:
        an internally toothed ring gear disposed coaxially with the rotation axis;
        an inner gear disposed coaxially with an eccentric axis in a posture parallel to the rotation axis such that an external toothed portion thereof is engaged with a portion of an internal toothed portion of the ring gear; and a drive shaft fitted into the inner gear, the phase adjustment mechanism is configured with a differential speed reduction mechanism in which the drive shaft is rotated about the rotation axis by the driving force of the electric actuator such that the inner gear revolves around the rotation axis while spinning on the eccentric axis, and the valve opening and closing timing control apparatus further comprises:

a biasing member provided on an outer peripheral portion of the drive shaft to apply a biasing force in a direction in which the external toothed portion of the inner gear is engaged with the internal toothed portion of the ring gear; and a displacement regulation portion provided between the drive shaft and the inner gear to regulate a displacement of the inner gear in a direction orthogonal to a biasing direction where the biasing force of the biasing member is applied on the basis of the drive shaft, wherein a pair of the displacement regulation portions, each including a protruding piece that protrudes in a direction orthogonal to the biasing direction where the biasing force of the biasing member is applied on the basis of the drive shaft and a spring that biases the protruding piece so as to protrude outward, are provided on an outer peripheral surface of the drive shaft.

10. The valve opening and closing timing control apparatus according to claim 9, wherein the outer periphery of the drive shaft includes a counter-biasing side surface, which is opposite to the biasing member with the eccentric axis interposed therebetween, and the counter-biasing side surface is spaced apart from an inner peripheral surface of the inner gear.

11. The valve opening and closing timing control apparatus according to claim 10, wherein the counter-biasing side surface is formed as a circumferential surface having a center deviated toward the biasing member from the eccentric axis.

12. The valve opening and closing timing control apparatus according to claim 11, wherein the counter-biasing side surface has the same radius as a radius of the inner peripheral surface about the eccentric axis.

13. The valve opening and closing timing control apparatus according to claim 9, wherein the inner gear is provided with a ring-shaped bearing on an inner periphery thereof so that an inner peripheral surface of the bearing functions as the inner peripheral surface of the inner gear.

14. The valve opening and closing timing control apparatus according to claim 10, wherein the inner gear is provided with a ring-shaped bearing on an inner periphery thereof so that an inner peripheral surface of the bearing functions as the inner peripheral surface of the inner gear.

15. The valve opening and closing timing control apparatus according to claim 11, wherein the inner gear is provided with a ring-shaped bearing on an inner periphery thereof so that an inner peripheral surface of the bearing functions as the inner peripheral surface of the inner gear.

16. The valve opening and closing timing control apparatus according to claim 12, wherein the inner gear is provided with a ring-shaped bearing on an inner periphery thereof so that an inner peripheral surface of the bearing functions as the inner peripheral surface of the inner gear.

* * * * *